(12) United States Patent
Pillay et al.

(10) Patent No.: US 9,094,439 B2
(45) Date of Patent: Jul. 28, 2015

(54) END NETWORK DECIDER

(71) Applicant: Bank of America Corporation, Charlotte, NC (US)

(72) Inventors: Venkat R. Pillay, Robbinsville, NJ (US); Paulo Resende, Robbinsville, NJ (US)

(73) Assignee: Bank of America Corporation, Charlotte, NC (US)

( * ) Notice: Subject to any disclaimer, the term of this patent is extended or adjusted under 35 U.S.C. 154(b) by 330 days.

(21) Appl. No.: 13/672,250

(22) Filed: Nov. 8, 2012

(65) Prior Publication Data

US 2014/0129724 A1    May 8, 2014

(51) Int. Cl.
  *H04L 29/08* (2006.01)
  *H04L 29/06* (2006.01)

(52) U.S. Cl.
  CPC .............. *H04L 67/141* (2013.01); *H04L 63/10* (2013.01); *H04L 67/2804* (2013.01)

(58) Field of Classification Search
  None
  See application file for complete search history.

(56) References Cited

U.S. PATENT DOCUMENTS

| | | | |
|---|---|---|---|
| 6,601,047 B2* | 7/2003 | Wang et al. | 705/75 |
| 7,478,436 B1* | 1/2009 | Shieh et al. | 726/28 |
| 2008/0027778 A1* | 1/2008 | Srinivasan et al. | 705/8 |
| 2008/0031235 A1* | 2/2008 | Harris et al. | 370/389 |
| 2009/0249440 A1* | 10/2009 | Platt et al. | 726/1 |
| 2011/0047292 A1* | 2/2011 | Gould et al. | 709/242 |
| 2012/0101928 A1* | 4/2012 | Fry et al. | 705/35 |
| 2012/0117608 A1* | 5/2012 | Metke et al. | 726/1 |
| 2012/0254381 A1* | 10/2012 | Rodrigues | 709/221 |

\* cited by examiner

*Primary Examiner* — Nicholas Taylor
*Assistant Examiner* — Clayton R Williams
(74) *Attorney, Agent, or Firm* — Michael A. Springs

(57) ABSTRACT

According to one embodiment, an apparatus may store a mapping of a plurality of applications to a plurality of end networks. The apparatus may receive a request associated with executing an application from the plurality of applications and determine, based at least in part upon the mapping, an end network from the plurality of end networks that participates in the execution of the application. The end network may be mapped to the application. The apparatus may then establish a connection to the end network such that communications associated with the application are directed through the connection.

17 Claims, 3 Drawing Sheets

END NETWORK DECIDER

TECHNICAL FIELD

This disclosure relates generally to an apparatus for establishing a connection to an end network.

BACKGROUND

As the number of electronic applications have grown, so has the number of networks that correspond to these electronic applications. Users often face the challenge of remembering the network with which a device should establish a connection in order to execute a particular application.

SUMMARY OF THE DISCLOSURE

According to one embodiment, an apparatus may store a mapping of a plurality of applications to a plurality of end networks. The apparatus may receive a request associated with executing an application from the plurality of applications and determine, based at least in part upon the mapping, an end network from the plurality of end networks that participates in the execution of the application. The end network may be mapped to the application. The apparatus may then establish a connection to the end network such that communications associated with the application are directed through the connection.

According to another embodiment, a system may communicate a request to initiate execution of an application and execute, at least in part, the application. The system may store a mapping of a plurality of applications to a plurality of end networks and receive the request associated with executing an application from the plurality of applications. The system may then determine, based at least in part upon the mapping, an end network from the plurality of end networks that participates in the execution of the application. The end network may be mapped to the application. The system may then establish a connection to the end network such that communications associated with the application are directed through the connection.

Certain embodiments may provide one or more technical advantages. A technical advantage of one embodiment includes increasing network bandwidth by reducing the number of direct connections formed with end devices. Another technical advantage may include increasing network speed by streamlining communication through a server. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
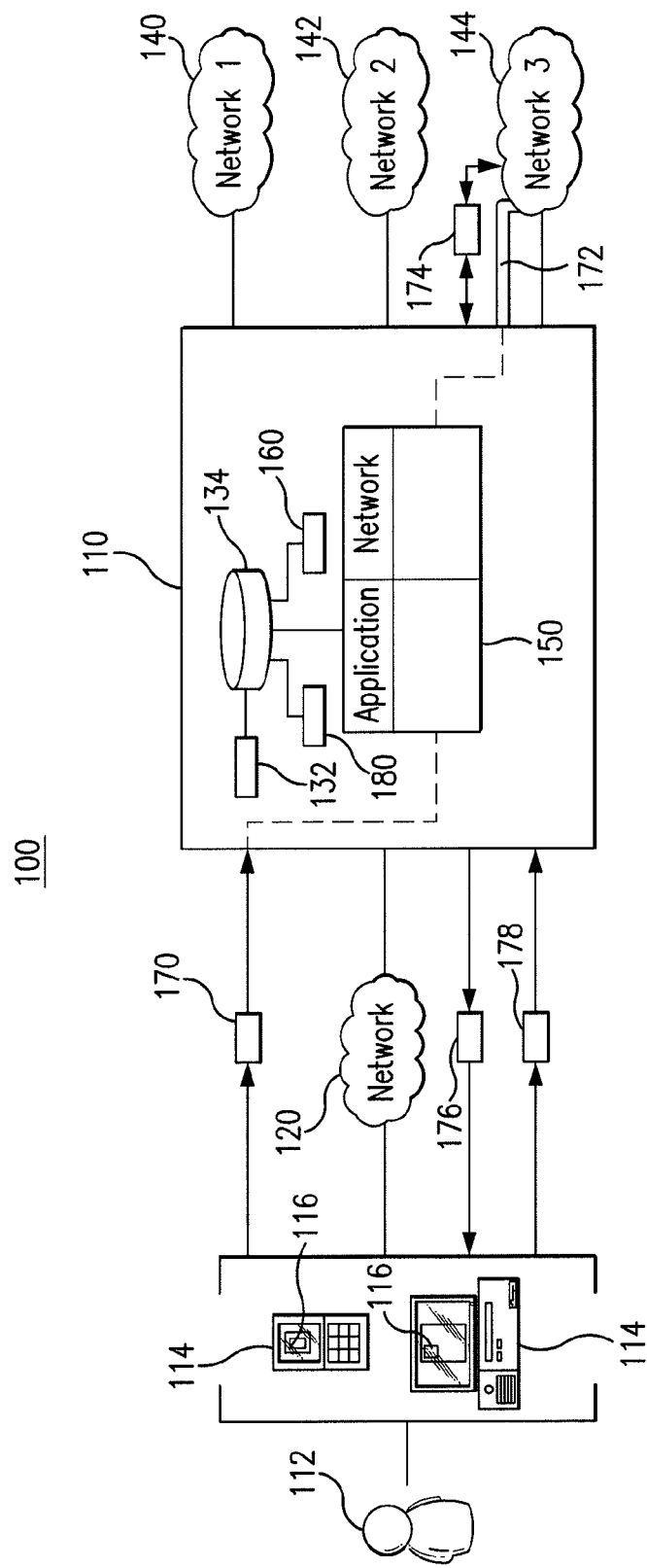
FIG. 1 illustrates a system for establishing a connection to an end network.
Figure 2:
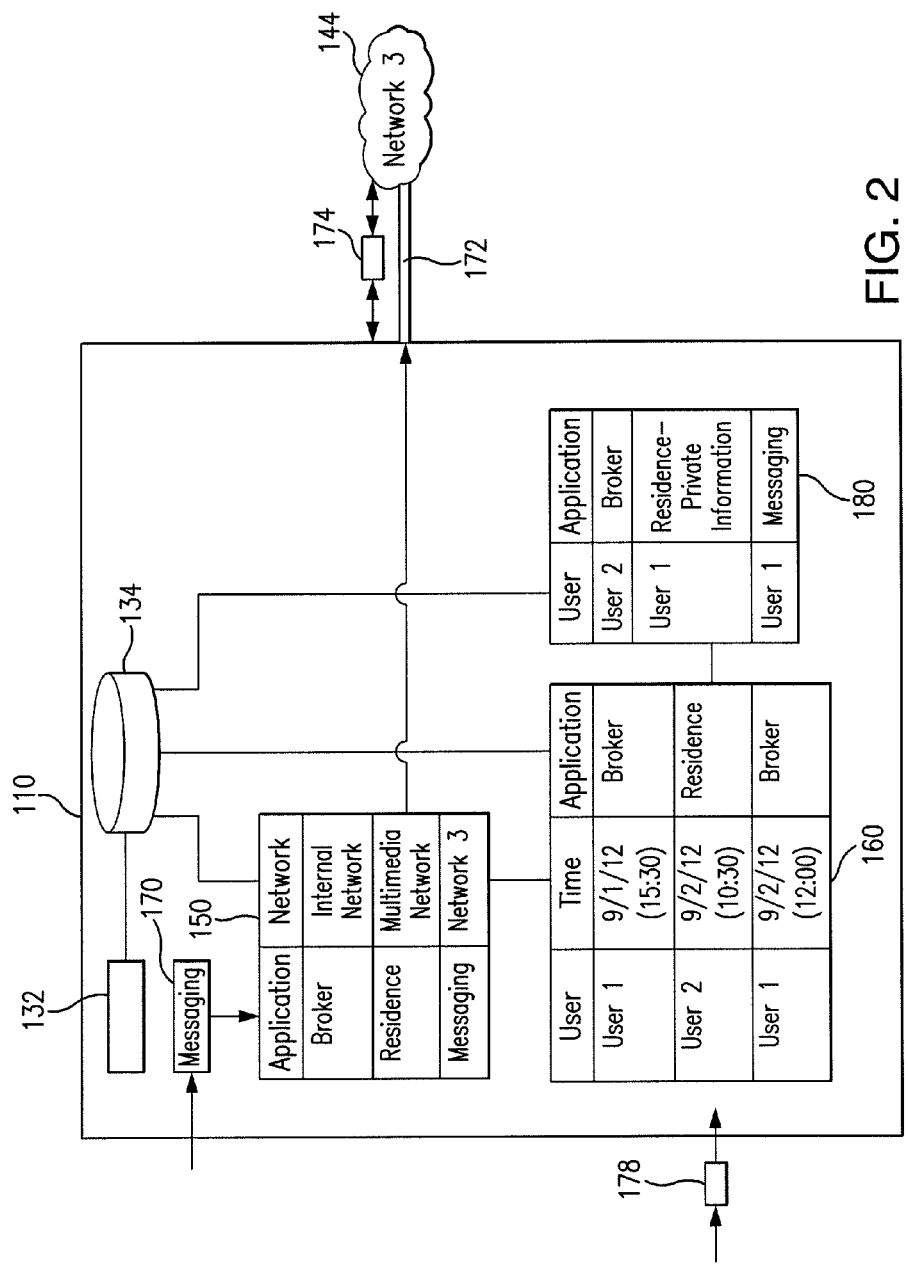
FIG. 2 illustrates a server of the system of FIG. 1 for establishing a connection to an end network.
Figure 3:
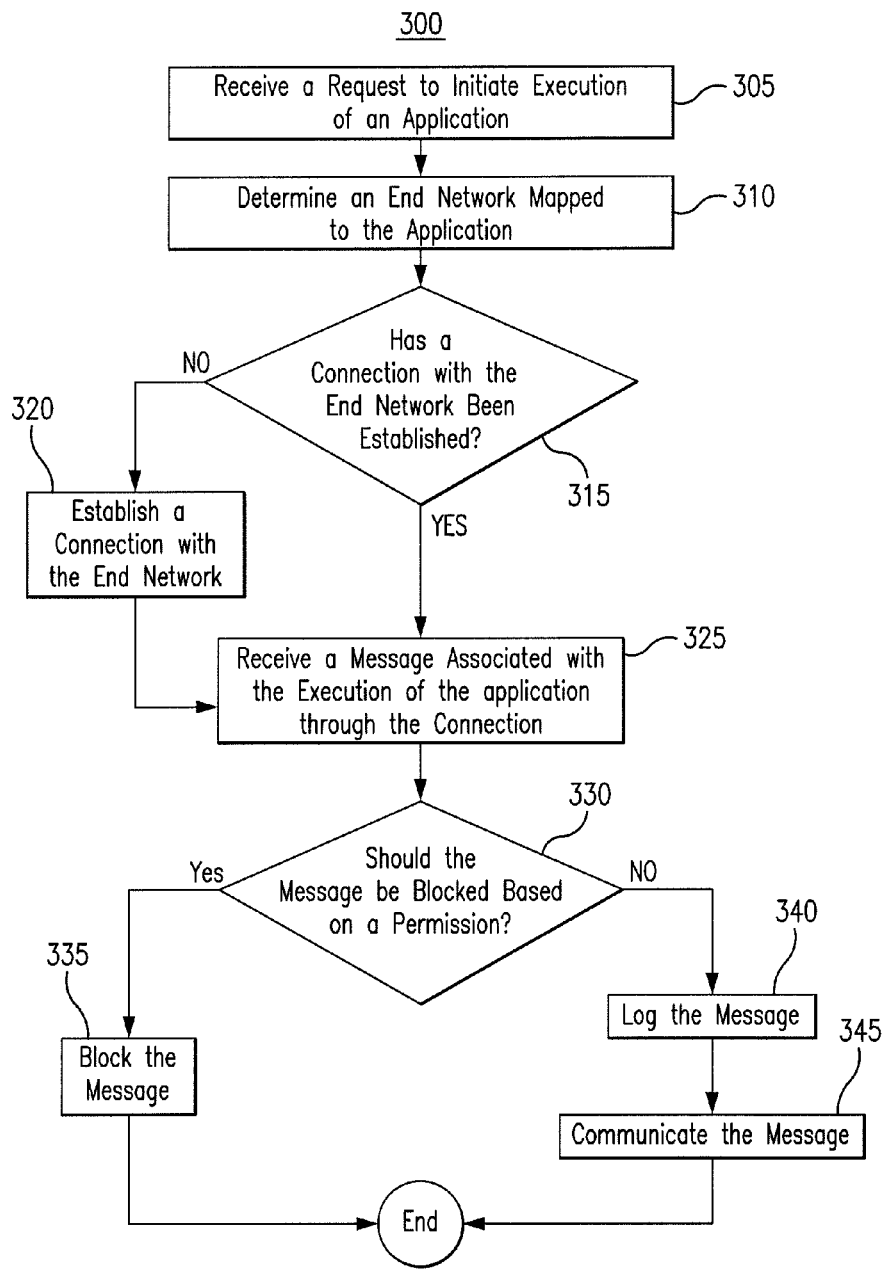
FIG. 3 is a flowchart illustrating a method of establishing a connection to an end network.

Embodiments of the present disclosure and its advantages are best understood by referring to FIGS. 1 through 3 of the drawings, like numerals being used for like and corresponding parts of the various drawings.

This disclosure describes a system and method for determining an appropriate end network for a particular application and establishing a connection to the appropriate end network to execute the application. As the number of electronic applications have grown, so has the number of end networks that correspond to these electronic applications. To execute a particular application, users often face the challenge of remembering the corresponding network with which a connection should be established to execute the application. For example, an employee may wish to execute a company proprietary application on the user's cell phone. However, in order to execute the company proprietary application, a connection between the cell phone and the company's proprietary network needs to be established. Typically, if the user is at home and wishes to execute the application, the user would travel to the company's office in order to establish a connection with the company network, and the user would have to remember how to connect to the company proprietary network through his cell phone in order to execute the application. Therefore, executing the application comes at a great expense to the user.

The disclosed system and method may reduce that expense. Using a cell phone, the user may request execution of the application. The request may be sent over a public network such as the Internet. A server in the system intercepts the request and determines which application is being requested. The server may also determine an end network that corresponds to the application. Using the previous example, the server may determine that the company proprietary network corresponds to the company proprietary application requested by the user. The server may make this determination by examining a table stored in the server.

After the server determines the appropriate end network for the requested application, the server may establish a connection with the appropriate end network. After the connection has been established, the server may communicate data messages between the cell phone and the end network through the connection. The communication of the data messages may allow the requested application to execute properly. For example, if the user is executing an office messaging application, the data message may include a chat message that the user is communicating to a recipient.

In this manner, the user may execute the requested application without having to remember which end network corresponds to the requested application. Furthermore, the user may execute the requested application through a connection to a public network such as the Internet. Moreover, by using the system, network resources and bandwidth associated with end networks and the public network may be conserved because fewer devices would be forming connections with the end networks.

FIG. 1 illustrates a system 100 for establishing a connection 172 to an end network 144. System 100 may include a device 114 communicatively coupled to a server 110 through a network 120. Server 110 may be communicatively coupled to one or more end networks 140, 142, and 144. A user 112 may use system 100 to request the execution of an application 116. In response, server 110 may determine an appropriate end network that corresponds to the requested application 116. Server 110 may then establish a connection 172 with the appropriate end network. Data messages 174 may then be communicated through this connection 172 in order for the requested application 116 to execute. By using system 100, user 112 may avoid having to remember the appropriate end network for a particular application 116. Furthermore, by using system 100, resources and bandwidth associated with the end networks may be increased.

User 112 may use a device 114 to interact with system 100. For example, user 112 may use device 114 to request the execution of an application 116. Device 114 may participate in the execution of the application 116. For example, a portion of application 116 may be executing on device 114 and a portion of the application 116 may be executing on other elements of system 100, such as server 110 and an end network. Device 114 may appropriately execute application 116 after a connection 172 to the appropriate end network has been established.

Device 114 may include a memory and a processor operable to store and execute an application 116. In order to properly execute application 116, a connection 172 may need to be established to an end network 144. For example, an office messaging application 116 may require device 114 to be connected to a proprietary office network. If a connection 172 has not been established to the proprietary office network, then the office messaging application 116 may not execute properly.

Device 114 may be a mobile device such as a cell phone or tablet. Device 114 may be a personal computer, a workstation, a laptop, a wireless or cellular telephone, an electronic notebook, a personal digital assistant, a tablet, or any other device (wireless, wireline, or otherwise) capable of receiving, processing, storing, and/or communicating information with other components of system 100. Device 114 may also include a user interface, such as a display, a touchscreen, a microphone, keypad, or other appropriate terminal equipment usable by user 112.

Network 120 facilitates communications between device 114 and server 110. Network 120 may be a public network 120 such as the Internet. This disclosure contemplates any suitable network 120 operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components. This disclosure contemplates end networks having one or more of the described properties of network 120.

Server 110 may perform various functions so that a requested application 116 may execute properly. Server 110 may include a processor 132 and a memory 134 that perform the functions described herein. For example, memory 134 may perform storage functions such as storing an application network table 150 and processor 132 may perform determining functions such as determining an appropriate end network 144 for a requested application 116.

Memory 134 may store, either permanently or temporarily, data, operational software, or other information for processor 132. Memory 134 may include any one or a combination of volatile or non-volatile local or remote devices suitable for storing information. For example, memory 134 may include random access memory (RAM), read only memory (ROM), magnetic storage devices, optical storage devices, or any other suitable information storage device or a combination of these devices.

Processor 132 may control the operation and administration of server 110 by processing information received from network 120 and memory 134. Processor 132 may include any hardware and/or software that operates to control and process information. Processor 132 may be a programmable logic device, a microcontroller, a microprocessor, any suitable processing device, or any suitable combination of the preceding.

Server 110 determines the appropriate end network 144 for a requested application 116. Server 110 may use an application network table 150 to make this determination. The application network table 150 may indicate one or more applications 116 and one or more corresponding end networks. Each application 116 may be mapped to a particular end network. By using the application network table 150, server 110 may determine an appropriate end network for a requested application 116. For example, the user 112 may request to execute an office messaging application 116. In order for the office messaging application 116 to properly execute, a connection 172 should be established to an office proprietary network. Hence, the application network table 150 may indicate that the corresponding end network for the office messaging application 116 is the office proprietary network. In response to the user 112 requesting to execute the office messaging application, server 110 may examine the application network table 150 and determine that the office proprietary network is the appropriate end network for the office messaging application.

After determining the appropriate end network for requested application 116, server 110 may establish a connection 172 with the appropriate end network. Server 110 may be communicatively coupled to one or more end networks. In the example illustrated in FIG. 1, server 110 is communicatively coupled to Network 1 140, Network 2 142, and Network 3 144. This disclosure contemplates server 110 being communicatively coupled with any suitable number of end networks. In the example of FIG. 1, server 110 has determined that Network 3 144 is the appropriate end network for a requested application 116. Server 110 may establish a connection 172 with Network 3 144. Server 110 may communicate data messages 174 over connection 172, which allows for the proper execution of application 116. In the example of the office messaging application 116, data messages 174 may include chat messages communicated by the user 112. This disclosure contemplates any suitable type of end network. For example, Network 3 144 may be a public network such as the Internet, a private or proprietary network and/or a cloud service. This disclosure contemplates the end network including any appropriate number of devices 114.

Server 110 may log actions performed by user 112. Server 110 may log these actions for regulatory purposes. Server 110 may log the actions in a log 160. Log 160 may store information associated with the action. For example, log 160 may store a user name associated with user 112, the name of an application 116, a time that the action was performed, and/or an action type associated with the action. Log 160 may store any suitable information associated with the action. For example, log 160 may store screen captures of device 114 in order to satisfy regulations that require monitoring of what user 112 views.

Server 110 may block particular data messages 174 based on permissions 180 set in server 110. For example, a particular permission 180 may block user 112 from executing a brokerage application 116. In response to the permission 180, server 110 may block data messages 174 associated with the brokerage application from a device 114 associated with user 112. As another example, a particular permission 180 may block anyone but managers from seeing personally identifiable information. If user 112 is not a manager, server 110 may block, from a device 114 associated with user 112, data messages 174 that include personally identifiable information.

Server 110 may facilitate the authentication of user 112 before establishing a connection 172 to the appropriate end network. For example, the request 170 may be accompanied by information that identifies user 112 such as a username and/or a password. Server 110 may use that information to authenticate user 112. The authentication may allow server 110 to determine whether user 112 is authorized to communicate over a connection 172 with the end network. Furthermore, the authentication may allow server 110 to identify the user 112 associated with the request so that the server 110 may log and block communications appropriately.

By using system 100, user 112 may avoid having to remember the appropriate end networks for applications 116. Furthermore, by using system 100, network resources associated with the end networks may be more efficiently used and bandwidth may be conserved by reducing the number of devices 114 establishing connections directly with the end networks.

In operation, system 100 may facilitate establishing of a connection 172 with an appropriate end network for a requested application 116. User 112 may request to execute an application 116 using a device 114. Device 114 may communicate a request 170 to server 110. The request 170 may include information associated with user 112 such as a user name, information associated with device 114 such as a name and/or an IP address, and/or information associated with the application 116 such as an application name and/or an identifier that identifies the application 116. For example, if user 112 requests to execute a brokerage application, then device 114 may communicate a request 170 that includes a user name associated with user 112, an IP address associated with device 114, and the name of the brokerage application to server 110. The request 170 may signal server 110 to determine the appropriate end network for the requested application 116.

Server 110 may receive the request 170 and use the application network table 150 to determine an appropriate end network for the requested application 116. For example, the application network table 150 may associate particular applications 116 with appropriate end networks. The application network table 150 may include the names of applications 116 and the IP addresses of end networks. This disclosure contemplates the application network table 150 including any suitable information associated with applications 116 and end networks, such as, for example, IP addresses and/or identifiers. Server 110 may use information associated with the requested application 116 included in the request 170 to determine the appropriate end network. For example, the request 170 may include the name of the requested application 116. Server 110 may then use that included name to reference the application network table 150. In the example of FIG. 1, server 110 has determined that Network 3 144 corresponds to the requested application 116 based on the application network table 150.

After server 110 determines the appropriate end network for the requested application 116, server 110 may establish a connection 172 with the appropriate end network. In the example of FIG. 1, server 110 has determined that Network 3 144 is the appropriate end network for the requested application 116. Server 110 may then establish a connection 172 with Network 3 144. The connection 172 may allow for the communication of data messages 174 between server 110 and Network 3 144.

Server 110 may receive and communicate data messages 174 through the connection 172. The data messages 174 may include information associated with the execution of the requested application 116. For example, if the requested application 116 is a multimedia application, data messages 174 may include video and/or audio associated with the multimedia. As another example, if the requested application 116 is a brokerage application, data messages 174 may include the values of various stocks and bonds used during the execution of the brokerage application.

Server 110 may communicate a response 176 to device 114. The response 176 may indicate an action taken by server 110. For example, after server 110 establishes the connection 172 with the appropriate end network, server 110 may communicate a response 176 indicating that the connection 172 has been established. The response 176 may also include information included in data message 174. For example, if data message 174 included the values of various stocks and bonds, response 176 may also include the values of those stocks and bonds. If device 114 is executing a brokerage application, then the brokerage application may use the values of the various stocks and bonds during execution.

Device 114 may communicate a data message 178 to server 110. Device 114 may communicate data message 178 during the execution of application 116. The data message 178 may include information that is used during the execution of application 116. For example, if application 116 was an office messaging application, data message 178 may include a chat message sent by user 112. Server 110 may receive the data message 178 and communicate it to the appropriate end network through the established connection 172.

In this manner, system 100 may determine the appropriate end network for a requested application 116. After determining the appropriate end network, server 110 may establish a connection 172 with the end network. Server 110 may then communicate data messages 174 over the connection 172 so that the requested application 116 may execute properly. By using system 100, network resources and bandwidth associated with the end networks may be conserved and efficiency of these end networks may be increased.

FIG. 2 illustrates a server 110 of the system 100 of FIG. 1 for establishing a connection 172 to an end network. For clarity, particular elements of system 100 have not been illustrated in FIG. 2. As provided by FIG. 2, server 110 may be communicatively coupled to Network 3 144. Server 110 may have established a connection 172 with Network 3 144 based on a received request 170.

When server 110 receives request 170, server 110 may use the request 170 to reference an application network table 150. The entries in the application network table 150 may indicate the appropriate end networks for particular applications. In the example of FIG. 2, the application network table 150 indicates that the application named "broker" corresponds to an internal network, the application named "residence" corresponds to a multimedia network, and the application named "messaging" corresponds to Network 3 144. This disclosure contemplates the application network table 150 storing entries for any suitable application and any suitable network in any suitable format or manner. In the example of FIG. 2, request 170 indicates that a messaging application should be executed. According to the application network table 150, the messaging application corresponds to Network 3 144. As a result, server 110 may establish a connection 172 with Network 3 144. After the connection 172 has been established, server 110 may receive and communicate data messages 174 with Network 3 144. The data messages 174 may be used in the execution of the messaging application. For example, data message 174 may include a chat message intended for a recipient.

Server 110 may store a log 160 that includes information associated with particular user actions. In the example of FIG. 2, log 160 includes entries for user 1 and user 2. User 1 performed actions associated with the broker application on September 1st and September 2nd. User 2 performed an action associated with the residence application on September 2nd. This disclosure contemplates log 160 storing any suitable information associated with user actions in any suitable format or manner. For example, log 160 may further store an action type such as executing an application and closing an application. As another example, log 160 may store screen captures of a device 114 associated with a particular user. In this manner, server 110 may track user actions, what applications a user executes, and what the user sees. Log 160 may be configured based on a particular regulatory scheme. For example, if a regulation requires tracking of what a user sees, then log 160 may store screen captures of a device associated with a user.

Server 110 may block particular communications based on a permission 180. Permission 180 may indicate content that a particular user may not be allowed to access and/or view. In the example of FIG. 2, permission 180 indicates that user 2 has a block associated with the broker application and user 1 has blocks associated with a residence application and a messaging application. The block associated with the residence application is limited to private information. Based on permission 180, user 2 may be prevented from accessing or viewing the broker application while user 1 may be prevented from accessing or viewing the messaging application. Furthermore, user 1 may be prevented from viewing private information exchanged during execution of the residence application. When server 110 receives data messages 174 and 178, server 110 may reference the permission 180 to determine if an applicable block should be placed on the received data messages 174 and 178. If there is an applicable block, server 110 may alter the data messages 174 and 178 and/or prevent the communication of the data messages 174 and 178. This disclosure contemplates permission 180 indicating any appropriate block for any suitable user. This disclosure further contemplates server 110 storing any suitable number of permissions in any suitable format and/or manner.

FIG. 3 is a flowchart illustrating a method 300 of establishing a connection 172 to an end network. Server 110 may perform method 300. By performing method 300, server 110 may determine an appropriate end network for a requested application and establish a connection with that determined end network. In this manner, resources and bandwidth associated with the end network may be conserved.

Server 110 may begin by receiving a request to initiate execution of an application in step 305. The request may include a name and/or an identifier associated with the application. In step 310 server 110 may determine an end network mapped to the application. Server 110 may store an application network table that maps applications to their appropriate end networks. Server 110 may reference the application network table to determine the end network mapped to the requested application. In step 315, server 110 may determine whether a connection 172 with the determined end network has been established. If a connection has not been established, server 110 may establish a connection with the end network in step 320. In particular embodiments, server 110 may facilitate the authentication of a user prior to establishing the connection. For example, the request of step 305 may be accompanied by information associated with the user such as a username and/or a password. Server 110 may use that information to authenticate the user prior to establishing the connection.

After a connection has been established with the end network, server 110 may receive a message associated with the execution of the application through the connection in step 325. The message may be a data message that is used during the execution of the requested application. For example, if the requested application is a messaging application the message may include a chat message intended for a recipient.

In step 330 server 110 may determine whether the message should be blocked based on a permission. Permissions may indicate which users are allowed to access and/or view particular content. If the message should be blocked, server 110 may block the message in step 335.

If the message should not be blocked, server 110 may log the message in step 340. Server 110 may store a log that tracks particular user actions for regulatory purposes. Server 110 may log the message and associate the message in the log with a particular user executing the application. The log may store any suitable information, such as for example, a time when the request of step 305 was received and a user associated with the request. In step 345, server 110 may communicate the message. The message may be communicated to the end network and/or a device associated with the user in response to the request of step 305.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus comprising:
   a memory operable to store a mapping of a plurality of applications to a plurality of end networks; and
   a processor communicatively coupled to the memory and operable to:
   receive, from a device, a request associated with executing an application from the plurality of applications, wherein the device is operable to execute, at least in part, the application;
   determine, based at least in part upon the mapping, an end network from the plurality of end networks that participates in the execution of the application, wherein the end network is mapped to the application; and
   establish a connection to the end network such that communications between the application and the end network are directed through the connection,
   wherein the memory is further operable to store a log, wherein the log stores a username of a user who initiated the request, a name of the application from the plurality of applications, and a screenshot taken as the device executes, at least in part, the application; and
   wherein the screenshot is taken based at least in part upon a regulation that requires tracking of what a user sees.

2. The apparatus of claim 1, wherein the processor is further operable to perform an authentication prior to establishing the connection.

3. The apparatus of claim 1, wherein the processor is further operable to block a communication associated with the application based at least in part upon a permission associated with the application.

4. The apparatus of claim 1, wherein the request is received through a public network.

5. The apparatus of claim 1, wherein the processor is further operable to communicate a response to the request in order for the application to continue execution.

6. The apparatus of claim 1, wherein the end network is a private network.

7. A method comprising:
storing, by a memory, a mapping of a plurality of applications to a plurality of end networks;
receiving from a device a request associated with executing an application from the plurality of applications, wherein the device is operable to execute, at least in part, the application;
determining, by a processor, based at least in part upon the mapping, an end network from the plurality of end networks that participates in the execution of the application, wherein the end network is mapped to the application;
establishing a connection to the end network such that communications between the application and the end network are directed through the connection; and
storing, by the memory, a log, wherein the log stores a username of a user who initiated the request, a name of the application from the plurality of applications, and a screenshot taken as the device executes, at least in part, the application; and
wherein the screenshot is taken based at least in part upon a regulation that requires tracking of what a user sees.

8. The method of claim 7, further comprising performing, by the processor, an authentication prior to establishing the connection.

9. The method of claim 7, further comprising blocking, by the processor, a communication associated with the application based at least in part upon a permission associated with the application.

10. The method of claim 7, wherein the request is received through a public network.

11. The method of claim 7, further comprising communicating, by the processor, a response to the request in order for the application to continue execution.

12. The method of claim 7, wherein the end network is a private network.

13. A system comprising:
a device comprising a processor operable to:
communicate a request to initiate execution of an application of a plurality of applications; and
execute, at least in part, the application; and
a server comprising a memory and a processor operable to:
store a mapping of the plurality of applications to a plurality of end networks;
receive the request associated with executing the application from the plurality of applications;
determine, based at least in part upon the mapping, an end network from the plurality of end networks that participates in the execution of the application, wherein the end network is mapped to the application;
establish a connection to the end network such that communications between the application and the end network are directed through the connection; and
store a log, wherein the log stores a username of a user who initiated the request, a name of the application from the plurality of applications, and a screenshot taken as the device executes, at least in part, the application; and
wherein the screenshot is taken based at least in part upon a regulation that requires tracking of what a user sees.

14. The system of claim 13, wherein the server is further operable to perform an authentication prior to establishing the connection.

15. The system of claim 13, wherein the server is further operable to block a communication associated with the application based at least in part upon a permission associated with the application.

16. The system of claim 13, wherein the request is received through a public network.

17. The system of claim 13, wherein the server is further operable to communicate a response to the request in order for the application to continue execution.

* * * * *